US006272175B1

(12) United States Patent
Sriram et al.

(10) Patent No.: US 6,272,175 B1
(45) Date of Patent: Aug. 7, 2001

(54) VIDEO SIGNAL CODING SYSTEMS AND PROCESSES USING ADAPTIVE QUANTIZATION

(75) Inventors: Parthasarathy Sriram, San Jose; Anurag Bist, Irvine, both of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 08/799,995

(22) Filed: Feb. 13, 1997

(51) Int. Cl.[7] .............................. H04B 1/66; H04N 7/12
(52) U.S. Cl. ..................... 375/240; 348/404; 382/251
(58) Field of Search .................... 348/403, 404, 348/405, 414, 417, 418, 422, 425, 384, 396, 27; 386/246; 358/433; 382/232, 236, 251, 252; 375/240; H04N 7/12; H04B 1/66

(56) References Cited

U.S. PATENT DOCUMENTS 4,716,453 * 12/1987 Pawelski ........................... 348/396
5,287,200 * 2/1994 Sullivan et al. .................. 358/433
5,475,502 * 12/1995 Lee et al. .......................... 348/384

(List continued on next page.)

OTHER PUBLICATIONS

Guido M. Schuster, Optimal Decomposition For Quad–Trees With Leaf Dependencies, Visual Communication and Image Processing '97, San Jose, CA, USA Feb. 12–14, 1997, vol. 1 3024, pt. 1, pp. 59–70, XP002098297 ISSN 0277–786X, Proceedings of the SPIE—The International Society for Optical Engineering, 1997, SPIE–Int. Soc. Opt. Eng, USA.

Anurag Bist et al., Constrained Trellis Based Rate Control Scheme For Low Bit Rate Video Coding, Proceedings of the International Conference on Image Processing, (IC, Lausanne, Sep. 16–19, 1996, vol. 2, Sep. 16, 1996, pp. 61–64, XP002067812, Institute of Electrical and Electronic Engineers).

Antonio Ortega et al., Optimal Buffer–Constrained Source Quantization and Fast Approximations, Proceedings of the International Symposium on Circuits and Systems, San Diego, May 10–13, 1992, vol. 1, No. Conf. 25, 1992, pp. 192–195, XP000606116, Institute of Electrical and Electronic Engineers.

Wim Coene et al., A Fast Route For Applications of Rate–Distortion Optimal Quantization in an MPEG Video Encoder, Proceedings of the International Conference on Image Processing, (IC Lausanne, Sep. 16–19, 1996, vol. 2. Sep. 16, 1996, pp. 825–828, XP000733350, Institute of Electrical and Electronic Engineers).

Matthew Crouse, Joint Thresholding and Quantization Selection For Decoder–Compatible Baseline JPEG, Proceedings of the International Conference on Acoustics, Speech, and Signal Processing (ICASSP). Detroit, May 9–12, 1995 Image and Multi–dimensional Signal Processing Application Development, vol. 4, No. Conf. 20, May 9, 1995, pp. 2331–2334, XP000535417, Institute of Electrical and Electronic Engineers.

*Primary Examiner*—Chris S. Kelley
*Assistant Examiner*—Gims S. Philippe
(74) *Attorney, Agent, or Firm*—Price Gess & Ubell

(57) ABSTRACT

A compression system and process employs a group of quantizers (or sets of predefined quantized values) and involes the selection of the quantizers for each video frame or frame portion. For each frame portion, a selection of the most appropriate quantizer is made. The selection of which quantizer from the selection group is most appropriate for coding of a video frame or frame portion is based on a formula which takes into account both the distortion (accuracy) and bit rate characteristics of each quantizer. The quantizer that exhibits the best combined distortion and bit rate characteristics is selected for coding the frame or frame portion. A similar formula, based on both distortion and bit rate characteristics, is used to select the particular quantization value within the quantizer set for each video signal value being coded.

11 Claims, 2 Drawing Sheets

U.S. PATENT DOCUMENTS 5,481,309 * 1/1996 Juri et al. .............................. 348/404
5,495,244 * 2/1996 Je-Chang et al. .................... 348/404
5,724,453 * 3/1998 Ratnakar et al. .................... 348/405

* cited by examiner

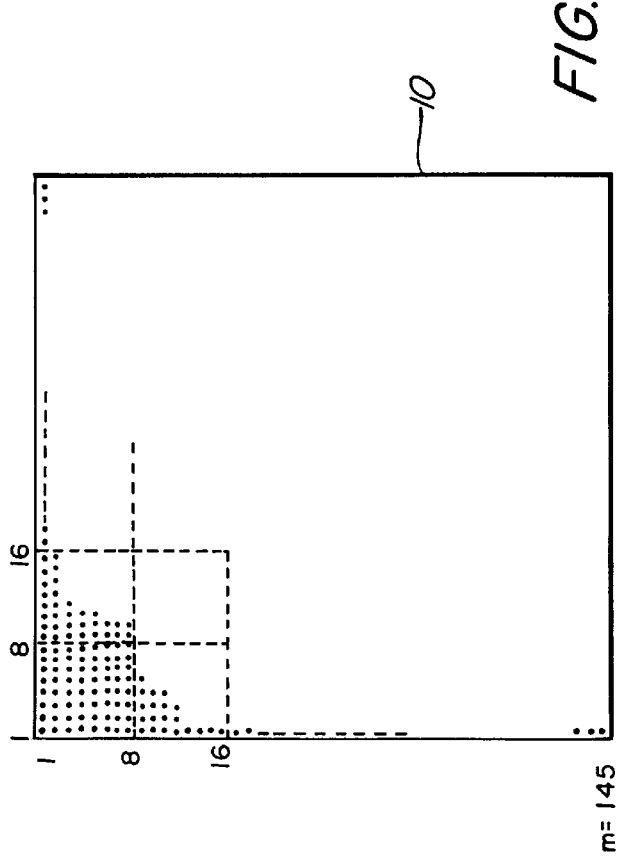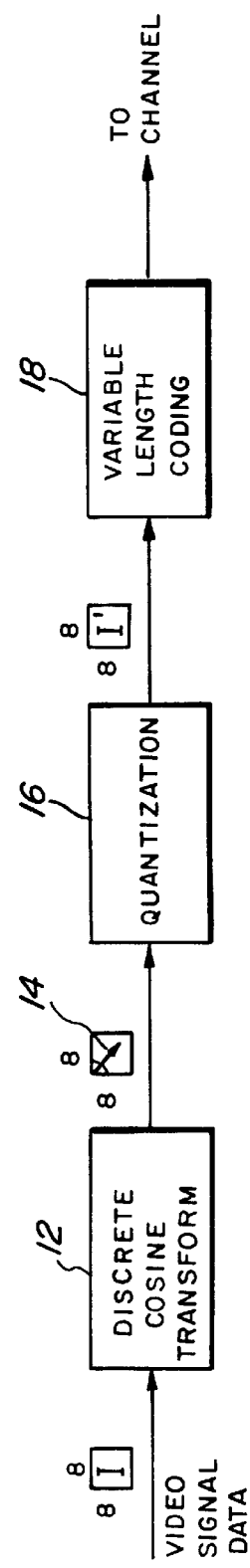

ated for H.263+ and MPEG-4 video standards.

VIDEO SIGNAL CODING SYSTEMS AND PROCESSES USING ADAPTIVE QUANTIZATION

FIELD OF THE INVENTION

The present invention relates to devices for, and processes of, coding video signals using adaptive quantization which, in preferred embodiments, can be readily adapted for H.263+ and MPEG-4 video standards.

BACKGROUND OF THE INVENTION

Coding of digital video signals for transmission over a transmission channel, or for storage in a storage medium, has become widely practiced in a variety of contexts, especially in multimedia environments. Such contexts include video conferencing, video games, internet image transmissions, digital TV and the like. Devices used in these contexts typically include program-controlled coding processors (e.g., personal computers, hardware boards, multimedia boards and other suitable processing devices) for carrying out processes of coding (or decoding) video signals.

Video signals generally include coded data corresponding to one or more video frames, wherein each video frame is composed of an array of picture elements (pels). A typical color video frame can be of a variety of resolutions. In one common resolution known as quarter common interface format (QCIF), such as represented in FIG. 1, a video frame is composed of over twenty-five thousand picture elements (pels), arranged in an array of 144 pels×176 pels, where each pel has color (or hue) and luminance characteristics. Digital signals representing such video frame data can involve a relatively large number of bits. However, in many contexts, the available bandwidth for transmitting such signals is limited, or the available storage space (memory) is limited. Therefore, compression coding processes are used to more efficiently transmit or store video data.

Standards for compression coding processes have been developed by various organizations. For example, the International Telecommunication Union (ITU) has developed H series standards, which are typically used for real-time communications, such as videophones. Also, the International Organization for Standardization (ISO) has developed the Motion Picture Experts Group (MPEG) series standards, such as MPEG-1 and MPEG-2.

Compression coding processes in accordance with such standards typically involve a quantization step, in which sampled video signal data values are represented by (or mapped onto) a fixed number of predefined quantizer values, typically with some loss in accuracy. For example, consider the video input signal represented as a sine wave ranging between 0 and 255. As the video data signal is sampled, each data sample will have a data value of one of the 256 values possible within the above-noted range. If the number of bits allowed by the system (or the transmission channel bandwidth) for coding these values is limited to, for example, five, then the 256 video signal data values must be mapped to (and represented by) $2^5=32$ quantizer values. In this manner, the quantized signal will be composed of quantizer values that are, in fact, estimates (with some loss in accuracy) of the sampled video signal values. For example, depending upon the quantization scheme, the quantized value selected from the set of 32 values to represent (map) a particular video signal data value is typically the quantizer value within the set that is the closest to the video signal data value or, alternatively, the quantizer value that is the closest value higher than the video signal data value or the closest value lower than the video signal data value. In any case, unless the video signal data value just happens to be equal to a quantizer value, the quantized value of the video signal data value will be an estimate of (but not equal to) the actual video signal data value.

Ordinarily, when more bits are available for coding each video signal value, more quantizer values are available in the quantizer set and, therefore, higher accuracy in the compression coding (i.e., lower distortion) may be achieved. However, as noted above, communication systems and transmission channels function with limited bandwidths and data storage devices have limited storage capacities. Therefore, the number of bits available for coding each signal value (and, thus, the number of quantizer values available) is typically limited. Accordingly, typical moder systems must function with a quantization scheme that maps the video signal data onto a limited number of mapped (quantized) values and, thus, necessarily produces some loss in accuracy (distortion).

Some improvements in accuracy and distortion may be made by designing the quantizer set to include those values that have been found (by experimentation) to have the highest probability of being selected. However, the quantizer values that have the highest selection probability in one portion of a video frame are typically different from the quantizer values that have the highest selection probability in another portion of the frame, and, in a moving video context, such values differ from frame-to-frame as well. Typical coding systems employing current H.263 video standards and MPEG-4 verification models do not have the ability to change quantizers as much as one would like, to adapt to such statistical changes.

SUMMARY OF THE DISCLOSURE

It is an object of preferred embodiments of the present invention to provide an improved compression coding system and process which are capable of providing improved accuracy (less distortion) and/or improved bit rate characteristics.

It is a further object of preferred embodiments of the invention to provide such a system and process which adapts to the statistical changes of the imagery in a video signal while maintaining the basic structure of the quantization processes of H 263+ standard and MPEG-4 video verification model.

These and other objects are achieved, according to preferred embodiments, with a system and process for coding video signals, employing an adaptive quantization scheme. In preferred embodiments, quantization is carried out by selecting a quantizer (a set of quantization values) from a plurality or group of predefined quantizers (sets of quantization values), for each frame or, more preferably, for each frame portion (e.g., each 16×16 block or 8×8 block of pels, also referred to as a macro block, in the video coding context). In this manner, the system or process is capable of changing to a different quantizer for different video frames or, preferably, for different portions of the same frame.

The quantizer selection is based on a determination of which quantizer provides the best distortion and bit rate characteristics among the quantizers available in the selection group for the portion of the video signal being coded. In preferred embodiments, the selection is based on a formula which takes into account both the distortion (accuracy) and bit rate. The quantizer that exhibits the best combined distortion and bit rate characteristics is selected for coding the frame or frame portion. In preferred embodiments, a similar formula, based on both distortion and bit rate characteristics, is used to select the particular quantization value within the quantizer set for each video signal value being coded. As a result, significantly improved overall coding efficiency and accuracy were observed.

BRIEF DESCRIPTION OF THE DRAWINGS

FIG. 1 is a representation of a typical video frame.

FIG. 2a is a block diagram representing a compression coding process for coding video signal data for Intra blocks.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

For purposes of an illustrative example, embodiments of the present invention are described with respect to a video signal associated with a number of video frames, wherein one video frame 10 is shown in FIG. 1 (not to scale) as having "m" rows and "n" columns of picture elements (pels), where n=176 columns of pels and m=144 rows of pels. A video signal representing such a video frame includes coded data corresponding to each pel in the frame. Video signals typically involve coded data for multiple frames which, when displayed in sequence, provide the effect of motion video. While a video frame may be composed of thousands of pels (depending upon the frame size), coding operations for video signals are typically performed with smaller samples of the overall frame, such as the 16×16 pel sample composed of four 8×8 pel blocks shown in broken lines in FIG. 1.

Color video signals include color and luminance components for each pel, which can be represented by matrices of pels. For example, the video signal associated with the 176×144 pel frame 10 of FIG. 1 has a "y" component associated with the luminance, which is also represented by a 176×144 matrix, and "u" and "v" components associated with the chromance of the pels, each of which are represented by an 88×72 matrix. In this manner, each pel in the frame is associated with a y value, a u value and a v value. For example, y∈(0 to 255), u∈(−127 to +127), and v∈(−127 to +127).

Figure 2B:
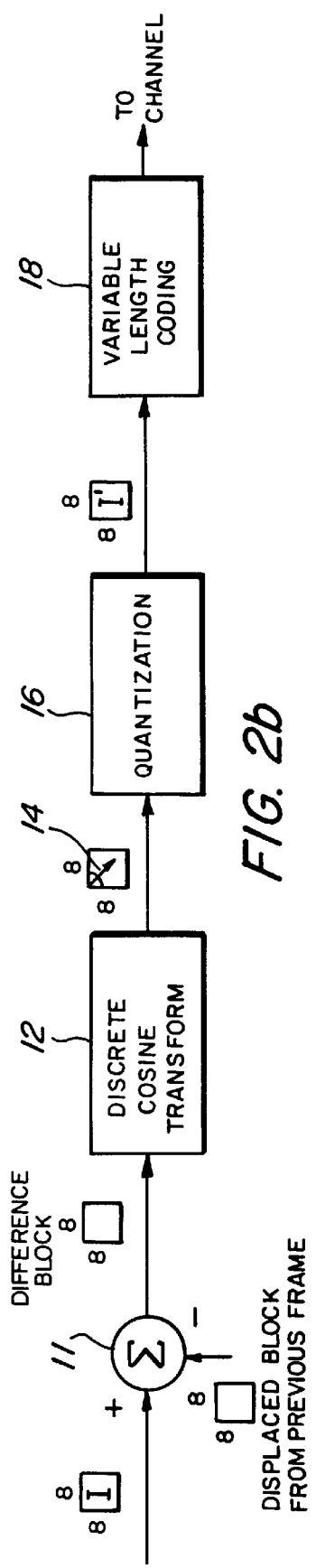
FIG. 2b is a block diagram representing a compression coding process for coding video signal data for Inter blocks.

A compression coding process, generally represented by FIG. 2a for Intra blocks and by FIG. 2b for Inter blocks, involves a discrete cosine transform (DCT) step 12, a quantization step 16, and a variable length coding step 18, for compressing and coding an input video data signal "I" for transmission on a fixed bandwidth communication link to a receiver (not shown) at a receiver end of the link. For Inter blocks, the process shown in FIG. 2b includes an additional motion compensation step 11 is carried out prior to the DCT step 12. The motion compensation step 11 involves the summing operation in which a displaced block from a previous frame using motion vector from motion estimation is subtracted from the input video data signal "I" for a block (e.g., 8×8 block), to provide a motion compensated difference block (e.g., 8×8 motion compensated difference block) as the input to the DCT step 12. In FIGS. 2a and 2b, the DCT step 12 is performed on the signal component associated with the y values for each processing sample block (e.g., each 16×16 block or each 8×8 block), the u values for each block and the v values for each block of the video signal. The DCT step provides an output for each block, representing Y, U and V components of each pel of a block as values within a defined range, for example, Y∈(−2048, +2048), U∈(−2048, +2048), and V∈(−2048, +2048), with the higher values typically positioned toward the top left corner of each block and the values decreasing in the direction of arrow 14 toward the lower right corner of each block.

In the quantization step 16, each DCT value in the block is mapped to a value within a fixed set of quantization values, based on a quantization scheme. As discussed in more detail below, a preferred quantization scheme (or process) in accordance with H.263 and MPEG-4 video standards involves a step of calculating values Y', U' and V' from the Y, U, and V components of each pel of a block. Following the calculation step, a selecting step is carried out, in which a value for each Y', U' and V' is selected from a predefined set of quantizer values (i.e., a quantizer set), for example, based on which quantizer value is closest to the Y', U' or V' value. In this manner, each block of Y, U, and V values is quantized to a corresponding block of quantizer values.

A calculation step for calculating Y', U' and V' values in accordance with a preferred quantization process involves a number of calculations. Referring to a Y block (e.g., a 16×16 block of Y component data values) as a representative example, the calculation step involves a calculation to determine a level for each pel in the block, using the Y value for the pel in the following equation:

level=the integer part of the equation [(Y+offset)/2QP]

where offset=−QP/2 and QP is a constant selected from the range: $1 \leq QP \leq 31$.

The QP value is determined, using well known linear bit rate control techniques, depending upon the number of bits allowed by the bit constraints of the system and also depending upon the desired image quality (fine/course quality). The lower the QP value, the finer (more accurate) the image quality, but the greater the number of bits required to code each data value.

From the calculated level value for each pel, a Y' value is determined, using the following equation:

Y'=(2QP×level)+QP

In this manner, a Y' value is calculated for each Y value in the block. Furthermore, as a result of the equations used in the above calculations, each Y' value is a multiple of QP, based on the corresponding Y value.

In typical quantization systems in accordance with the H.263 standards and MPEG-4 verification model, the Y' value is used for selecting a quantizer value from a set of quantizer values (the quantizer set), where each quantizer value in the set is a multiple of QP. A standard quantizer set used under the H.263 standards and MPEG-4 verification model is defined as follows:

$R_0 \in \{0, \pm 3QP, \pm 5QP, \pm 7QP, \ldots\}$

For example, the quantizer value (QP multiple) selected from the set $R_0$ to represent (or estimate) the calculated Y' value may be chosen as the closest value within the set {0, ±3QP, ±5QP, ±7QP, . . . } that is not greater than the value of Y' calculated from the above equations. In this manner, each Y value is mapped onto a quantizer value (QP multiple) selected from the set $R_0$ and each block of Y values is mapped to a corresponding block of quantizer values (QP multiples).

Thus, for a first example, if the Y value for a particular pel is +110 and the selected QP value is 20, then the above equations would render the following values:

offset=−QP/2=−10 level=the integer part of the equation [(Y+offset)/2QP]= [2.5]=2

Y'=(2QP)×level+QP=40×2+20=100, which is 5QP

If the value of Y must fall within the range −2048≦Y≦2048 then the quantizer set $R_0$ of estimated Y' values must have a QP-multiple which will represent the lowest possible value (−2048) as well as the highest possible value (2048). Using the standard QP-multiples set $R_0$, the set (or quantizer) would have to extend to ±110QP and is represented as follows:

$R_0 \epsilon \{0, \pm 3QP, \pm 5QP, \pm 7QP, \ldots \pm 101QP\}$

The calculated Y' value of 5QP happens to be identical to a QP-multiple value within the set: {0, ±3QP, ±5QP, ±7QP, . . . ±101QP}. Thus, in the above representative example, the Y value of a pel, 110, was mapped to a Y' value, 5QP. However, the accuracy of the coded information suffers to some extent, as illustrated by the fact that the Y' value of 100 differs from the original Y value of 110, by almost 10% of the Y value.

In a second example, with the Y value of 110 as above, but the QP value of 2:

level=[(110−2/2)/2(2)]=[27.25]=27 and

Y'=2(2)×27+2=110=55QP.

Thus, in the second example, the Y value of a pel, 110, was mapped to a Y' value of 55QP.

Note that, with the relatively low QP value of 2, the number of possible QP-multiples is significantly greater than the first example above. In particular, with −2048≦Y≦+ 2048 (as in the first example above), but with QP=2, the standard set $R_0$ of possible Y' values (quantizer) extends to ±255QP, as follows: {0, ±3QP, ±5QP, ±7QP, . . . ±255QP}. Thus, with the QP value of 2, the number of possible Y' values is increased with respect to the first example, in which the QP value was 20. Accordingly, the accuracy of the Y' value is greater in the second example than in the first example (note that the calculated Y' value of 110 is equal to the original Y value). The number of bits required to code the possible Y' value is a function of the absolute value of level. The higher the magnitude of level, the more bits it would take to represent the possible Y' values. Because 27 is significantly greater than 2, the number of bits needed to code the possible Y' value is greater than in the first example.

The QP value is selected, based on the number of bits that can be transmitted over the transmission channel and the desired image quality (accuracy). More accurate coding (mapping) of pel values occurs with lower QP values. Thus, lower QP values may be used with certain portions (e.g., certain 16×16 pel blocks, or certain 8×8 blocks) of the video frame in which higher accuracy is desired, such as portions of the frame in which movement occurs, than in other portions of the frame.

By selecting an appropriate QP value, the number of estimated Y' values in the standard quantizer set $R_0 \epsilon (0, \pm 3QP, \pm 5QP, \pm 7QP, \ldots)$ is determined for a given number of Y values. The Y values for each block of the video frame are thereby mapped to a corresponding block of estimated Y' values from the set $R_0$ in the quantization step, as discussed above.

Figure 3:
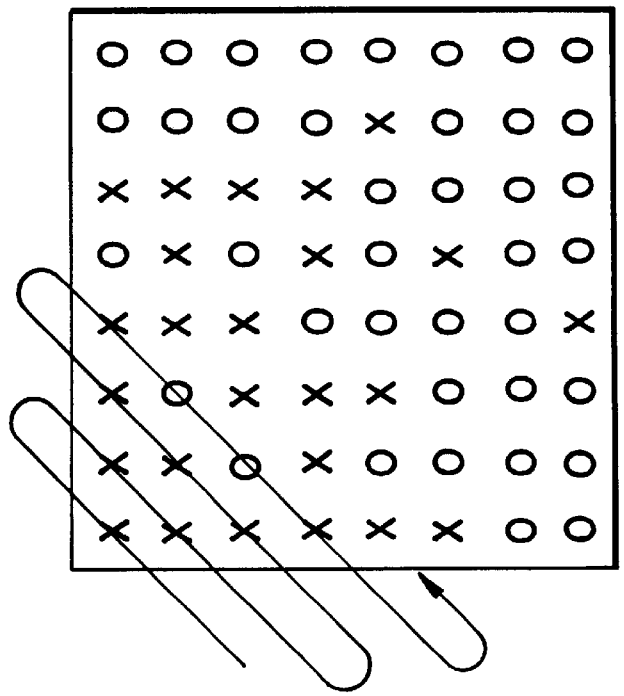
FIG. 3 is a representation of an 8×8 pel block of a video frame, after the DCT and quantization steps of the process shown in FIG. 2.

As a result of the DCT step (step 12), the Y' values toward the lower, right corner of the block will tend to be small. If QP is high enough, the Y' values for many of the pels toward the lower, right corner of the block will be zero, and the quantisized 8×8 block could appear, as shown in FIG. 3, where an "x" represents a value other than zero and "0" represents a value of zero.

The pel values in the block are then coded (step 18) using a variable length coding scheme, such as Huffman coding or other suitable coding schemes. Huffman coding is preferred because of its accuracy (loss less nature) and because strings of zeros, which tend to occur toward the lower, right corner of the quantized block (see FIG. 3), can be coded with a relatively high coding efficiency. This efficiency can be enhanced by coding the data for each pel in the zig-zag sequence represented by the arrow 20 in FIG. 3.

The coded data is then provided for transmission on a transmission channel to a receiver (not shown). At the receiver end, the Huffman-coded transmission is decoded to obtain the data for the coded block of Y' values. Calculations, reversing the above-discussed calculations, are performed on the Y' values to obtain representations of the original Y values. In this manner, a representation of the original Y component of a frame is obtained at the receiver. The U and V components of the frame are processed in a like manner and representations of these components are also obtained at the receiver end. As a result, a representation of the original frame is ultimately obtained at the receiver and may be displayed or stored by appropriate display or storage devices (not shown). Multiple frames may be processed in this manner to provide the effect of a moving picture video when displayed.

According to preferred embodiments of the present invention, higher degree of accuracy and a lower bit rate may be achieved by using multiple sets $R_0 - R_n$ of quantizer values in the quantization step discussed above, and selecting the most appropriate set for a particular portion of the video image, such as for a predefined number or group of pels, e.g., each 8×8 block or each 16×16 block, discussed above. The particular set $R_x$ selected from the multiple sets $R_0 - R_n$ of quantizer values available for coding Y values may be changed between groups of pels, such as (but not limited to) groups of four 8×8 luminance blocks and two 8×8 chrominance blocks, typically refered to in video coding practice as "macroblocks." Similar selections of sets $R_x$ of quantizer values are carried out for coding U and V data values.

By experimentation, multiple sets $R_0 - R_n$ of quantizer values that are most likely to closely estimate the actual Y (U or V) values of the video signal are derived. Different sets may be derived for different QP values.

For example, in accordance with a preferred embodiment of the present invention, for QP=2, the following sets $R_0 - R_n$ (where n=14) were derived:

$R_0 = \{0, \pm 3QP, \pm 5QP, \pm 7QP, \ldots, \pm 255QP\}$ $R_1 = \{0, \pm 3QP, \pm 5QP, \pm 7QP, \ldots, \pm 255QP\}$ $R_2=\{0,\pm 3QP,\pm 5QP,\pm 7QP,\ldots,\pm 255QP\}$ $R_3=\{0,\pm 3QP,\pm 5QP,\pm 7QP,\ldots,\pm 255QP\}$ $R_4=\{0,\pm 3QP,\pm 5QP,\pm 7QP,\ldots,\pm 255QP\}$ $R_5=\{0,\pm 3QP,\pm 5QP,\pm 7QP,\ldots,\pm 255QP\}$ $R_6=\{0,\pm 3QP,\pm 5QP,\pm 7QP,\ldots,\pm 255QP\}$ $R_7=\{0,\pm 3QP,\pm 5QP,\pm 7QP,\ldots,\pm 255QP\}$ $R_8=\{0,\pm 3QP,\pm 5QP,\pm 7QP,\ldots,\pm 255QP\}$ $R_9=\{0,\pm 3QP,\pm 5QP,\pm 7QP,\ldots,\pm 255QP\}$ $R_{10}=\{0,\pm 3QP,\pm 5QP,\pm 7QP,\ldots,\pm 255QP\}$ $R_{11}=\{0,\pm 3QP,\pm 5QP,\pm 7QP,\ldots,\pm 255QP\}$ $R_{12}=\{0,\pm 3QP,\pm 5QP,\pm 7QP,\ldots,\pm 255QP\}$ $R_{13}=\{0,\pm 3QP,\pm 5QP,\pm 7QP,\ldots,\pm 255QP\}$ $R_{14}=\{0,\pm 3QP,\pm 5QP,\pm 7QP,\ldots,\pm 255QP\}$ While embodiments of the invention may involve any number of sets $R_0$–$R_n$ which differ from each other to any suitable degree, it has been found that significantly improved accuracy and bit rate can be achieved with sets $R_0$–$R_n$ that differ from each other at the lower multiples of QP (i.e., lower absolute value). Accordingly, the above sets $R_0$–$R_{14}$ differ from each other at the lower absolute values of multiples of QP, i.e., below 7QP and above −7QP in the above example. For multiples of QP greater than 6 and less than −6, the above sets are identical. The lower multiples of the above 15 sets $R_0$–$R_{14}$ represent all possible sequences of multiples of QP between −7QP and 7QP. Thus, during the quantization step, one of 15 possible quantizers (sets $R_0$–$R_{14}$) is selected and used for the coding of a frame or a portion of a frame (such as an 8×8 block, a 16×16 block). A selection is again made for coding the next frame or frame portion. In this manner, the quantizer $R_x$ may be changed for any frame or frame portion (i.e., 8×8 block or 16×16 block).

While the above example involves 15 quantizer sets $R_0$–$R_{14}$, derived by generating all possible sets which differ at absolute values of QP multiples below 7, a greater number of quantizers may be generated for sets that differ at higher absolute values of QP multiples. Similarly, a lower number of quantizers may be generated for sets that differ at lower absolute values of QP multiples. Furthermore, by experimentation, the quantizer sets that have the highest probability of being selected from the overall group of quantizers may be determined and the number of possible quantizer sets may be limited to those high probability sets. For example, by experimentation with the above quantizers $R_0$–$R_{14}$, it has been found that the sets $R_0$, $R_3$, $R_7$, and $R_{14}$ have the highest probability of selection, when the selection technique discussed below is used. Accordingly, in a preferred embodiment of the present invention, the quantizer values stored for selection by the processing electronics are limited to sets derived as discussed above, i.e., as all possible sets that differ below a particular QP multiple, or a number of those sets that have the highest probability of selection.

Selection of the appropriate quantizer set $R_x$ may be carried out in any suitable manner. However, in preferred embodiments, the quantizer set is selected based on a formula which takes into account both distortion and bit rate. According to one such preferred embodiment, the quantizer set which provides the lowest error "E" is selected, where:

$E = D + \lambda r$ and where D is a quantified value of the amount of distortion of the portion of the video image and r is a quantified bit rate. Other formulas for calculating an error value E based partially on the amount of distortion and bit rate factors may also be used.

According to the above formula, the effect of the rate r on the overall error value E is weighted by a factor of $\lambda$. The value of $\lambda$ may be predetermined as a design parameter, based on the desired degree of the effect of bit-rate on the selection of a quantizer set $R_x$, or computed in real-time as the function of the bit-rate. Alternatively, the value $\lambda r$ may be precomputed for different overall bit-rates and stored for access by the processor to avoid calculating this product for each input sample. A preferred $\lambda$ value of 2 has been found to provide superior results in many applications.

Thus, according to preferred embodiments of the present invention, the quantization step 16 involves a calculation of an error value E, based on the amount of distortion and the bit rate provided by each quantizer set in the selection group. This can result in a relatively large number of calculations for systems employing a large number of quantizer sets in the selection group. Accordingly, in preferred embodiments, the quantizer sets within the group of quantizers available for selection may be limited to the quantizer sets that have been found to have the highest probability of selection (such as quantizer sets $R_0$, $R_3$, $R_7$ and $R_{14}$ in the above preferred example).

Because the quantization step 16 involves the selection of a quantizer from a group of quantizers for each frame or portion of a frame (e.g., for each 8×8 block or 16×16 block), a code must be provided so that the receiver may identify which quantizer was selected and used during the quantization step for each frame or frame portion. For example, an identification code may be appended to the data coded for each frame or frame portion and transmitted therewith. The number of bits required for the identification code is dependent on the number of quantizers in the selection group. If the selection group consists of 15 quantizers (such as $R_0$–$R_{14}$ in the above example), then the identification code would include 4 bits (if uniform length code words are used to represent the identification code). On the other hand, if the selection group is limited to the highest probability selections (such as $R_0$, $R_3$, $R_7$ and $R_{14}$ in the above preferred example), then the number of bits required in the identification code may be significantly reduced (to 2, in the preferred example). Alternatively, variable length code words may be used to represent quantizers (e.g., shorter length code words for representing more frequently chosen quantizers and longer length code words for less frequently chosen quantizers). Even with the inclusion of a quantizer identification code with each coded frame or frame portion, an improvement in the overall bit rate, as well as a higher accuracy (lower distortion) was accomplished with the above described preferred process.

Further improvements in bit rate and accuracy are provided, according to further embodiments of the present invention, by employing an error calculation step as discussed above during the selection of a QP multiple within a quantizer set. In particular, instead of selecting the QP multiple which is the closest or closest and not greater to the calculated Y' (U' or V') value, as discussed above, an error calculation step is performed in which the error E' provided by each QP multiple is calculated and compared. The QP multiple which provides the lowest error E' is selected as the estimated Y' value. As with the above-discussed error calculations, the error E' is calculated from a formula which takes into account both distortion and bit rate. For example, the following formula may be used to calculate the error value E' for each QP multiple (however other formulas which take into account distortion and bit rate may alternatively be used):

$$E'=D'+\lambda'r'$$

where D' is a quantified value for distortion amount and r' is a quantified value for bit rate. The value of $\lambda'$ may be predetermined as a design parameter, based on the desired effect of bit-rate on the overall error value E', as discussed above, or may be computed in real-time as the function of the bit-rate. Alternatively $\lambda'r'$ may be precomputed for different overall bit-rates and stored for access by the processor during the error calculation step, to avoid calculating this product for each input sample. It has been found that a value of 60 for $\lambda'$ provides superior results in many applications.

Thus, as discussed above, the selection of the specific quantizer set that provides the best combined distortion and bit rate characteristics (based on a formula that takes into account the amount of distortion D and the bit rate r) among the quantizer sets in the selection group, can provide significant improvements in the overall accuracy and bit rate of the coding system. Furthermore, the selection of the particular value (QP multiple) within the selected quantizer set which provides the best combined distortion and bit rate characteristics (based on a formula that takes into account the amount of distortion D' and the bit rate r') among the values (QP multiples) within the selected quantizer set, can provide further improvements in the overall accuracy and bit rate of the coding system.

Such improvements are shown using standard ITU-T testing sequences in the following examples, in which, for each example "1", a quantizer set $R_0$ was used in accordance with a the conventional H.263 standard. For each example "2", a quantizer from the quantizer sets $R_0$, $R_3$, $R_7$ and $R_{14}$ where selected, with the selection based on the above-discussed error equations and the indicated $\lambda$ and $\lambda'$ values. For each example "3", only the quantizer set $R_0$ was used, but the selection of quantizer values within the set was base on the above-discussed error E' calculation.

ITU-T "Carphone" Sequence (R = 20 kbps) Examples

|  | example 1 | example 2 | example 3 |
| --- | --- | --- | --- |
| $\lambda$ and $\lambda'$ | none standard H.263 | $\lambda = 2$ $\lambda' = 60$ | $\lambda = 0$ $\lambda' = 60$ |
| distortion | 30.77 dB | 31.60 dB | 31.04 dB |
| bit rate | 24.19 kbps | 24.30 kbps | 23.95 kbps |
| frame rate | 5.05 Hz | 5.30 Hz | 5.30 Hz |
| no. of frames | 20 frames | 21 frames | 21 frames |

ITU-T "Mother & Daughter" Sequence (R=20 kbps) Examples

|  | example 1 | example 2 | example 3 |
| --- | --- | --- | --- |
| $\lambda$ and $\lambda'$ | none standard H.263 | $\lambda = 2$ $\lambda' = 60$ | $\lambda = 0$ $\lambda' = 60$ |
| distortion | 31.58 dB | 32.08 dB | 32.01 dB |
| bit rate | 23.47 kbps | 21.97 kbps | 23.17 kbps |
| frame rate | 5.25 Hz | 7.25 Hz | 5.50 Hz |
| no. of frames | 21 frames | 29 frames | 22 frames |

ITU-T "Susie" Sequence (R=20 kbps) Examples

|  | example 1 | example 2 | example 3 |
| --- | --- | --- | --- |
| $\lambda$ and $\lambda'$ | none standard H.263 | $\lambda = 2$ $\lambda' = 42$ | $\lambda = 0$ $\lambda' = 42$ |
| distortion | 32.61 dB | 33.48 dB | 33.01 dB |
| bit rate | 22.95 kbps | 23.26 kbps | 22.94 kbps |
| frame rate | 5.10 Hz | 5.41 Hz | 5.21 Hz |
| no. of frames | 20 frames | 21 frames | 20 frames |

As apparent from each of the above examples 1–3, better distortion and bit rate characteristics were achieved in examples 2 and 3, as compared to the standard example 1.

What is claimed is:

1. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets $R_0$–$R_n$, where each quantizer set differs from each other quantizer set in the group, wherein the step of selecting comprises the steps of:

determining the distortion and bit rate characteristics provided by each quantizer set in the group $R_0$–$R_n$; and selecting the quantizer set $R_x$ based on the distortion and bit rate characteristics provided by each quantizer set in the group;

determining and quantifying the distortion and bit rate characteristics provided by each quantizer in the selected quantizer set $R_x$;

calculating an error value E' for each pel and each quantizer value in the set $R_x$ according to the formula: $E'=D'+\lambda'r'$, where D' is a quantified distortion value, r' is a quantified bit rate value and $\lambda'$ is a weighting value selected based on the desired effect of r' on the overall E'; and selecting the quantizer value that exhibits the lowest E' value of the quantizer values within the set $R_x$.

2. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets $R_0$–$R_n$, wherein each quantizer set differs from each other quantizer set in the group, the selecting step including the steps of determining and quantifying the distortion and bit rate characteristics provided by each quantizer set in the group $R_0$–$R_n$ for each portion of the video frame being coded;

calculating an error value for each quantizer set in the group $R_0$–$R_n$ according to the formula: $E=D+\lambda.r$, where D is a quantified distortion value, r is a quantified bit rate value and $\lambda$ is a weighting value selected based on the desired effect of r on the overall E;

selecting the quantizer set $R_x$ that exhibits the lowest E value of the quantizer sets within the group $R_0$–$R_n$; and correlating each data value with a quantizer value from the selected quantizer set $R_x$ to provide a quantized set of values corresponding to the pel data value;

the correlating step including the steps of
determining the distortion and bit rate characteristics provided by each quantizer value in the selected quantizer set $R_x$; and
selecting the quantizer value based on the distortion and bit rate characteristics provided by each quantizer value in the set $R_x$.

3. An adaptive quantization method in a coding process for coding data values corresponding to each picture element (pel) of a portion of a video frame, the method comprising the steps of:

selecting, for each portion of a video frame, a quantizer set $R_x$ of quantizer values from the group consisting of:

$R_0 = \{0, \pm 3QP, \pm 5QP, \pm 7QP, \ldots, \pm 255QP\}$;

$R_1 = \{0, \pm 3QP, \pm 6QP, \pm 7QP, \ldots, \pm 255QP\}$;

$R_2 = \{0, \pm 3QP, \pm 4QP, \pm 7QP, \ldots, \pm 255QP\}$;

$R_3 = \{0, \pm 2QP, \pm 6QP, \pm 7QP, \ldots, \pm 255QP\}$;

$R_4 = \{0, \pm 2QP, \pm 5QP, \pm 7QP, \ldots, \pm 255QP\}$;

$R_5 = \{0, \pm 2QP, \pm 4QP, \pm 7QP, \ldots, \pm 255QP\}$;

$R_6 = \{0, \pm 2QP, \pm 3QP, \pm 7QP, \ldots, \pm 255QP\}$;

$R_7 = \{0, \pm 4QP, \pm 6QP, \pm 7QP, \ldots, \pm 255QP\}$;

$R_8 = \{0, \pm 4QP, \pm 5QP, \pm 7QP, \ldots, \pm 255QP\}$;

$R_9 = \{0, \pm 1QP, \pm 6QP, \pm 7QP, \ldots, \pm 255QP\}$;

$R_{10} = \{0, \pm 1QP, \pm 5QP, \pm 7QP, \ldots, \pm 255QP\}$;

$R_{11} = \{0, \pm 1QP, \pm 4QP, \pm 7QP, \ldots, \pm 255QP\}$;

$R_{12} = \{0, \pm 1QP, \pm 3QP, \pm 7QP, \ldots, \pm 255QP\}$;

$R_{13} = \{0, \pm 1QP, \pm 2QP, \pm 7QP, \ldots, \pm 255QP\}$;

$R_{14} = \{0, \pm 5QP, \pm 6QP, \pm 7QP, \ldots, \pm 255QP\}$.

correlating each data value with a quantizer value from the selected quantizer set $R_x$ to provide a quantized set of values corresponding to the pel data values.

4. An adaptive quantization method in a coding process for coding, data values corresponding to each picture element (pel) of a portion of a video frame, the method comprising the steps of:

selecting, for each portion of a video frame, a quantizer set $R_x$ of quantizer values from the group consisting of:

$R_0 = \{0, \pm 3QP, \pm 5QP, \pm 7QP, \ldots, \pm 255QP\}$;

$R_3 = \{0, \pm 2QP, \pm 6QP, \pm 7QP, \ldots, \pm 255QP\}$;

$R_7 = \{0, \pm 4QP, \pm 6QP, \pm 7QP, \ldots, \pm 255QP\}$;

$R_{14} = \{0, \pm 5QP, \pm 6QP, \pm 7QP, \ldots, \pm 255QP\}$; and correlating each data value with a quantizer value from the selected quantizer set $R_x$ to provide a quantized set of values corresponding to the pel data values.

5. A system for coding sampled video data corresponding to at least a portion of a video frame, comprising:

a storage means for storing a group of quantizer sets $R_0$–$R_n$ of quantizer values;

means for selecting, for each video frame being coded, a quantizer set $R_x$ from the group of quantizer sets $R_0$–$R_n$, dependent on the quantified distortion and the bit rate of the selected set $R_x$;

said selecting means further including
means for calculating an error value E for each portion of the video frame being coded and for each quantizer set in the group $R_0$–$R_x$, according to the formula: $E = D + \lambda r$, where D is a quantified distortion value, r is a quantified bit ate value and $\lambda$ is a weighting value selected based on the desired effect of r on the overall E; and
means for selecting the quantizer $R_x$ that exhibits the lowest E value of the quantizer sets within the group $R_0$–$R_n$;

means for correlating each video signal value for each frame portion being coded with a quantizer value from the set $R_x$ selected for that frame portion;

said means for correlating further including
means for determining and quantifying the distortion and bit rate characteristics of each quantizer value within the set $R_x$; and
means for selecting the quantizer value based on the distortion and bit rate characteristics provided by each quantizer value in the set $R_x$; and means for encoding the correlating quantizer values with a variable length encoding scheme.

6. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets $R_0$–$R_n$, where each quantizer set differs from each other quantizer set in the group, and the quantizer sets are selected from the group consisting of:

$R_0 = \{0, \pm 3QP, \pm 5QP, \pm 7QP, \ldots, \pm 255QP\}$;

$R_1 = \{0, \pm 3QP, \pm 6QP, \pm 7QP, \ldots, \pm 255QP\}$;

$R_2 = \{0, \pm 3QP, \pm 4QP, \pm 7QP, \ldots, \pm 255QP\}$;

$R_3 = \{0, \pm 2QP, \pm 6QP, \pm 7QP, \ldots, \pm 255QP\}$;

$R_4 = \{0, \pm 2QP, \pm 5QP, \pm 7QP, \ldots, \pm 255QP\}$;

$R_5 = \{0, \pm 2QP, \pm 4QP, \pm 7QP, \ldots, \pm 255QP\}$;

$R_6 = \{0, \pm 2QP, \pm 3QP, \pm 7QP, \ldots, \pm 255QP\}$;

$R_7 = \{0, \pm 4QP, \pm 6QP, \pm 7QP, \ldots, \pm 255QP\}$;

$R_8 = \{0, \pm 4QP, \pm 5QP, \pm 7QP, \ldots, \pm 255QP\}$;

$R_9 = \{0, \pm 1QP, \pm 6QP, \pm 7QP, \ldots, \pm 255QP\}$;

$R_{10} = \{0, \pm 1QP, \pm 5QP, \pm 5QP, \ldots, \pm 255QP\}$;

$R_{11} = \{0, \pm 1QP, \pm 5QP, \pm 4QP, \ldots, \pm 255QP\}$;

$R_{12} = \{0, \pm 1QP, \pm 5QP, \pm 3QP, \ldots, \pm 255QP\}$;

$R_{13} = \{0, \pm 1QP, \pm 5QP, \pm 2QP, \ldots, \pm 255QP\}$; and $R_{14} = \{0, \pm 5QP, \pm 5QP, \pm 6QP, \ldots, \pm 255QP\}$;

correlating each data value with a quantizer value from the selected quantizer set $R_x$ to provide a quantized set of values corresponding to the pel data values.

7. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets $R_0$–$R_n$, where each quantizer set differs from each other quantizer set in the group and the quantizer sets are selected from the group consisting of:

$R_0=\{0,\pm3QP,\pm5QP,\pm7QP,\ldots,\pm255QP\}$;

$R_3=\{0,\pm2QP,\pm6QP,\pm7QP,\ldots,\pm255QP\}$;

$R_7=\{0,\pm4QP,\pm6QP,\pm7QP,\ldots,\pm255QP\}$; and $R_{14}=\{0,\pm5QP,\pm6QP,\pm7QP,\ldots,\pm255QP\}$;

correlating each data value with a quantizer value from the selected quantizer set $R_x$ to provide a quantized set of values corresponding to the pel data values.

8. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets $R_0$–$R_n$, wherein each quantizer set differs from each other quantizer set in the group, the step of selecting comprising the steps of:

determining and quantifying the distortion and bit rate characteristics provided by each quantizer set in the group $R_0$–$R_n$ for each portion of the video frame being coded;

calculating an error value E for each quantizer set in the group $R_0$–$R_n$ according to the formula: $E=D+\lambda r$, where D is a quantified distortion value, r is quantified bit rate value and $\lambda$ is a weighting value selected based on a desired effect of r on a total E; and selecting the quantizer set $R_x$ having the lowest E value of the quantizer sets within the group $R_0$–$R_n$; and correlating each data value with a quantizer value from the selected quantizer set $R_x$ to provide a quantized set of values corresponding to the pel data values, the step of correlating comprising the steps of:

determining and quantifying the distortion and bit rate characteristics provided by each quantizer value in the selected quantizer set $R_x$;

calculating an error value E' for each pel and for each quantizer value in the set $R_x$ according to the formula: $E'=D'+\lambda' r'$, where D' is quantified distortion value, r' is a quantified bit rate value and $\lambda'$ is a weighting value selected based on the desired effect of r' on a total E';

selecting the quantize value having the lowest E' value of the quantizer values with the set $R_x$.

9. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of quantizer sets $R_0$–$R_n$, wherein each quantizer value in each quantizer set is a multiple of a quantization coefficient QP and each quantizer set has a different combination of two quantizer values from a set of values consisting of:

$\{=1QP,\pm2QP,\pm3QP,\pm4QP,\pm5QP,\pm6QP\}$;

the selecting step including the steps of determining the distortion and bit rate characteristics provided by each quantizer set in the group $R_0$–$R_n$; and selecting the quantizer set $R_x$ based on the distortion and bit rate characteristics provided by each quantizer set in the group; and correlating each data value with a quantizer value from the selected quantizer set $R_x$ to provide a quantized set of values corresponding to the pel data values.

10. The method as recited in claim 9, wherein the number of quantizer sets used in the selecting step is limited to a smaller number of quantizer sets based on the probability of each quantizer set in the group of quantizer sets $R_0$–$R_n$ being selected in the selecting step.

11. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of quantizer sets $R_0$–$R_n$, wherein each quantizer value in each quantizer set is a multiple of a quantization coefficient QP and each quantizer set differs from each other quantizer set in a range of quantizer values between 0 and $\pm 7QP$ and each quantizer set is identical to each other quantizer set outside the range of quantizer values;

the selecting step including the steps of determining the distortion and bit rate characteristics provided by each quantizer set in the group $R_0$–$R_n$; and selecting the quantizer set $R_x$ based on the distortion and bit rate characteristics provided by each quantizer set in the group; and correlating each data value with a quantizer value from the selected quantizer set $R_x$ to provide a quantized set of values corresponding to the pel data values.

* * * * *